United States Patent
Fok et al.

(10) Patent No.: US 7,828,216 B2
(45) Date of Patent: Nov. 9, 2010

(54) METHODS AND APPARATUS FOR PROVIDING ON-DEMAND ASSISTANCE FOR A WIRELESS DEVICE

(75) Inventors: Kenny Fok, San Diego, CA (US); Tia Manning Cassett, San Diego, CA (US); Eric Chi Chung Yip, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1161 days.

(21) Appl. No.: 11/336,435

(22) Filed: Jan. 20, 2006

(65) Prior Publication Data

US 2006/0204949 A1    Sep. 14, 2006

Related U.S. Application Data

(60) Provisional application No. 60/660,917, filed on Mar. 11, 2005.

(51) Int. Cl.
*G06K 7/10* (2006.01)
(52) U.S. Cl. .................. 235/472.02; 235/380; 706/11; 702/219
(58) Field of Classification Search ................ 235/375, 235/380, 472.01, 472.02, 475.03, 462.45; 706/11; 709/219; 702/219
See application file for complete search history.

(56) References Cited

U.S. PATENT DOCUMENTS

| | | | |
|---|---|---|---|
| 5,212,692 A | 5/1993 | Itoh | |
| 6,198,939 B1 | 3/2001 | Holmström et al. | |
| 6,760,759 B1 * | 7/2004 | Chan | 709/219 |
| 2002/0118220 A1 | 8/2002 | Lui et al. | |
| 2002/0188612 A1 | 12/2002 | Yu et al. | |
| 2004/0133532 A1 * | 7/2004 | Seitz et al. | 706/11 |
| 2004/0198475 A1 | 10/2004 | Kim | |

FOREIGN PATENT DOCUMENTS

| | | |
|---|---|---|
| WO | 0068769 | 11/2000 |
| WO | 0195652 | 12/2001 |

OTHER PUBLICATIONS

International Search Report-PCT/US06/009466- International Search Authority EPO- Jul. 6, 2006.
Written Opinion- PCT/US06/009466- International Search Authority EPO Munich- Jul. 6, 2006.

* cited by examiner

*Primary Examiner*—Karl D. Frech
(74) *Attorney, Agent, or Firm*—James T. Hagler

(57) ABSTRACT

Methods, devices, apparatus, computer-readable media and processors are provided that allow for on-demand user-assistance in a wireless communication device. User assistance is provided by demonstration routines that are stored locally and/or remotely, and which may be standard routines or customized routines to address the needs of the device user. The demonstration routines are accessed, and in some applications communicated to the wireless device, seamlessly to allow for a highly efficient means of providing user-assistance.

25 Claims, 8 Drawing Sheets

METHODS AND APPARATUS FOR PROVIDING ON-DEMAND ASSISTANCE FOR A WIRELESS DEVICE

CLAIM OF PRIORITY UNDER 35 U.S.C. §119

The present Application for Patent claims priority to Provisional Application No. 60/660,917 entitled "METHODS AND APPARATUS FOR PROVIDING ON-DEMAND ASSISTANCE FOR A WIRELESS DEVICE" filed Mar. 11, 2005, and assigned to the assignee hereof and hereby expressly incorporated by reference herein.

BACKGROUND

The described aspects relate generally to wireless communication devices and network communication. More particularly, the described aspects relate to providing on demand assistance to a wireless device user in the form of interactive demonstrations.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

The current trend in the wireless communication device industry is to market devices that have a wide range of functionality. For example, a single wireless communication device may be capable of wireless telephone communication, digital photography, wireless Internet communication, electronic mail (email) and/or Short Message Service (SMS) communication, wireless audio and/or video downloading, other wireless network service communications and the like. In addition, the wireless communication device may be capable of storing or wirelessly accessing numerous applications that can then be executed on the wireless communication device. Such multi-functionality means that the user of the wireless device needs to be adept at using all of the features and functionality of the wireless communication device.

In addition to user familiarity with the device functionality, a multi-functional device may typically result in more problems that the user may need to address during normal use of the device. As such problems arise, the need exists for the user to be able to address the problems as soon as possible, in order to effectively and efficiently restore functionality to the wireless device Generally, the user of the wireless device becomes adept at using all of the features and functions or addresses a problem related to the wireless device by reading a comprehensive wireless device operating manual, communicating with a service center for instructions or attempting to comprehend the functionality/address the problem through a trial and error process. All of these current options are time-consuming with respect to the user of the device.

Reading and comprehending the wireless device operating manual can be so time-consuming that most users choose to avoid this option altogether. Additionally, the mobile nature of the wireless device means the operating manual may not typically be readily available to the device user during normal device operation. Also, reading the wireless device operating manual provides no assurance that the user may understand the functionality of the device or be able to solve the problem related to the device.

Communicating with a service center for instructions typically involves the user placing a wireless call to a technical support "hotline." This process is generally frustrating to the user, who in most instances has to wait an undesirable period of time before connecting with a technical service representative and, in many instances, the instructions provided to the user over the telephone are difficult to comprehend or implement. If the user is unable to solve the problem via the hotline, the user may be left with no other option than to physically go to a service center and obtain a hands-on "live" demonstration.

In addition to the frustrating and time-consuming experience that device users incur, the network service or device providers that operate the technical support "hotline" are tasked with maintaining a resource-consuming operation. The resource-consuming problem on the service provider end is exasperated as more functions and applications are constantly being added to wireless communication devices. Maintaining an ever-expanding and resource-consuming operation is a costly endeavor for the network service or device providers.

Currently, wireless communication devices may be equipped with applications that provide help information based on a feature that the user is interested in knowing more about or a problem that the user is experiencing with the wireless device. However, storage limitations on the wireless device make it difficult for the wireless device to store and address every conceivable feature or problem that a user may encounter. Furthermore, as new functionality or applications are added to a wireless device during its useful life, a pre-existing help application is unable to provide assistance in using the new functions or applications or addressing problems encountered with the new functions or applications. Additionally, many of the problems that a user encounters may be unique to the user and, as such, may not be addressed in a generic help application. In instances in which the help application does not provide adequate help the user is typically forced to resort to contacting the technical support "hotline."

Therefore, a need exists to create a user-assistance module or application executable on the wireless communication device that provides efficient, access to assistance demonstration. The desired user-assistance application may provide seamless user access to a large, updateable, database of user-assistance demonstrations. The desired user-assistance demonstrations may be inter-active to provide the user with an effective means of retaining the functionality assistance or problem resolution. In addition, the desired user-assistance application should be capable of providing the user timely access to demonstrations that can be customized based on the desired help or assistance that a user requires. Such a module may be able to provide the device user with an efficient process for obtaining device assistance and, in instances that dictate such, provide the user with an efficient process for obtaining customized device assistance. Additionally, the desired user-assistance application may provide network or device providers with a process that limits the use of "live"

technical support, thus, making the process less of a financial burden on the network providers or device providers.

SUMMARY

Thus, devices, methods, apparatus, computer-readable media and processors are presented that provide for on-demand user-assistance in wireless communication device. A user-assistance module is provided that is executes demonstration routines on the wireless device. The demonstration routines may be stored locally on the wireless device, stored remotely at a wirelessly accessible network device or the routines may be custom generated to meet specific assistance needs of a device user.

In some aspects, a method is provided for generating user-assistance demonstrations on a wireless communication device. The method includes receiving a request for user assistance at the wireless communication device, accessing a demonstration routine corresponding to the request and executing the demonstration routine on the wireless communication device. Accessing the demonstration routines may involve accessing locally stored demonstration routines, wirelessly accessing remotely stored demonstration routines or generating a custom demonstration routine in response to network service communication.

In some aspects, a machine-readable medium is provided, which, when executed by a machine, causes the machine to perform operations including receiving a request for user assistance at the wireless communication device, accessing a demonstration routine corresponding to the request and executing the demonstration routine on the wireless communication device.

In other aspects, at least one processor device is configured to perform the operations of receiving a request for user assistance at the wireless communication device, accessing a demonstration routine corresponding to the request and executing the demonstration routine on the wireless communication device.

In yet other aspects, a wireless communication device is provided that includes a computer platform including a processing engine and a memory unit; and a user-assistance module stored in the memory unit and operable by the processing engine, the user-assistance module operable to receive a request for user assistance, wherein the user-assistance module is operable to execute a demonstration routine on the wireless device based on the request for user assistance.

In still other aspects, a wireless communication device is defined that includes a means for processing data on the wireless device, a means for storing data on the wireless device that is in communication with the mean for processing data and a means for providing, via the means for processing data, user-assistance demonstrations on the wireless device based on a received request for user assistance.

Additionally, in some other aspects, an apparatus for providing on-demand user-assistance demonstrations to a wireless communication device is defined. The apparatus includes a user manager device that stores a plurality of demonstration routines and communicates, upon request, a demonstration routine to the wireless communication device for execution on the wireless device; and a user-assistance service accessible to a user of the wireless communication device and in communication with the user manager device.

In yet other aspects, the apparatus for providing on-demand user-assistance demonstrations to a wireless communication device is defined by a means for providing user-assistance demonstration routines on a wireless communication device and a means for remotely storing a plurality of demonstration routines that are wirelessly communicable, upon request, to the means for providing user-assistance demonstration routines.

In further aspects, a method for wirelessly providing user-assistance demonstrations to a wireless communication device includes receiving, wirelessly, at a network device, a request for a demonstration routine from the wireless communication device, accessing in network device memory the requested demonstration routine and communicating the demonstration routine, wirelessly, from the network device to the wireless communication device.

Also, additional aspects are defined by A machine-readable medium including instructions, which, when executed by a machine, cause the machine to perform operations. The operations include receiving, wirelessly, at a network device, a request for a demonstration routine from the wireless communication device, accessing in network device memory the requested demonstration routine and communicating the demonstration routine, wirelessly, from the network device to the wireless communication device.

In some other aspects, at least one processor device is configured to perform the operations of receiving, wirelessly, at a network device, a request for a demonstration routine from the wireless communication device, accessing in network device memory the requested demonstration routine and communicating the demonstration routine, wirelessly, from the network device to the wireless communication device.

In yet other aspects, a method for wirelessly providing user-assistance demonstrations to a wireless communication device is provided. The method includes generating a customized demonstration routine at a network service node and communicating, wirelessly, the customized demonstration routine to the wireless communication device, wherein the customized demonstration routine was created based on communication between a user of the wireless communication device and the network service.

In still other aspects, a machine-readable medium that includes instructions, which, when executed by a machine, cause the machine to perform operations. The operations include generating a customized demonstration routine at a network service node and communicating, wirelessly, the customized demonstration routine to the wireless communication device, wherein the customized demonstration routine was created based on communication between a user of the wireless communication device and the network service.

Other aspects include, at least one processor device configured to perform the operations of generating a customized demonstration routine at a network service node and communicating, wirelessly, the customized demonstration routine to the wireless communication device, wherein the customized demonstration routine was created based on communication between a user of the wireless communication device and the network service.

Thus, the described aspects provide for an efficient, on demand system for presenting wireless device user assistance in the form of demonstration routines.

BRIEF DESCRIPTION OF THE DRAWINGS

The disclosed aspects will hereinafter be described in conjunction with the appended drawings, provided to illustrate and not to limit the disclosed aspects, wherein like designations denote the elements, an in which.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The present devices, apparatus, methods, computer-readable media and processors provide for on-demand, user-assistance on a wireless communication device. The user-assistance is provided in the form of demonstration routines provided by a user-assistance module executed on a wireless communication device. The user-assistance module allows the user of the wireless device to efficiently access and execute, on-demand, the demonstration routines. In one aspect, the demonstration routines may be accessed locally on the wireless device. In an alternate aspect, the demonstration routines may be accessed remotely, via wireless communication with a network device. In yet another alternate aspect, the user-application module provides for the user of the wireless device to communicate with a network service, such as a service provider technical support center that has the capability to create and communicate custom demonstration routines to the user-assistance module based on user-specific assistance needs.

Figure 1:
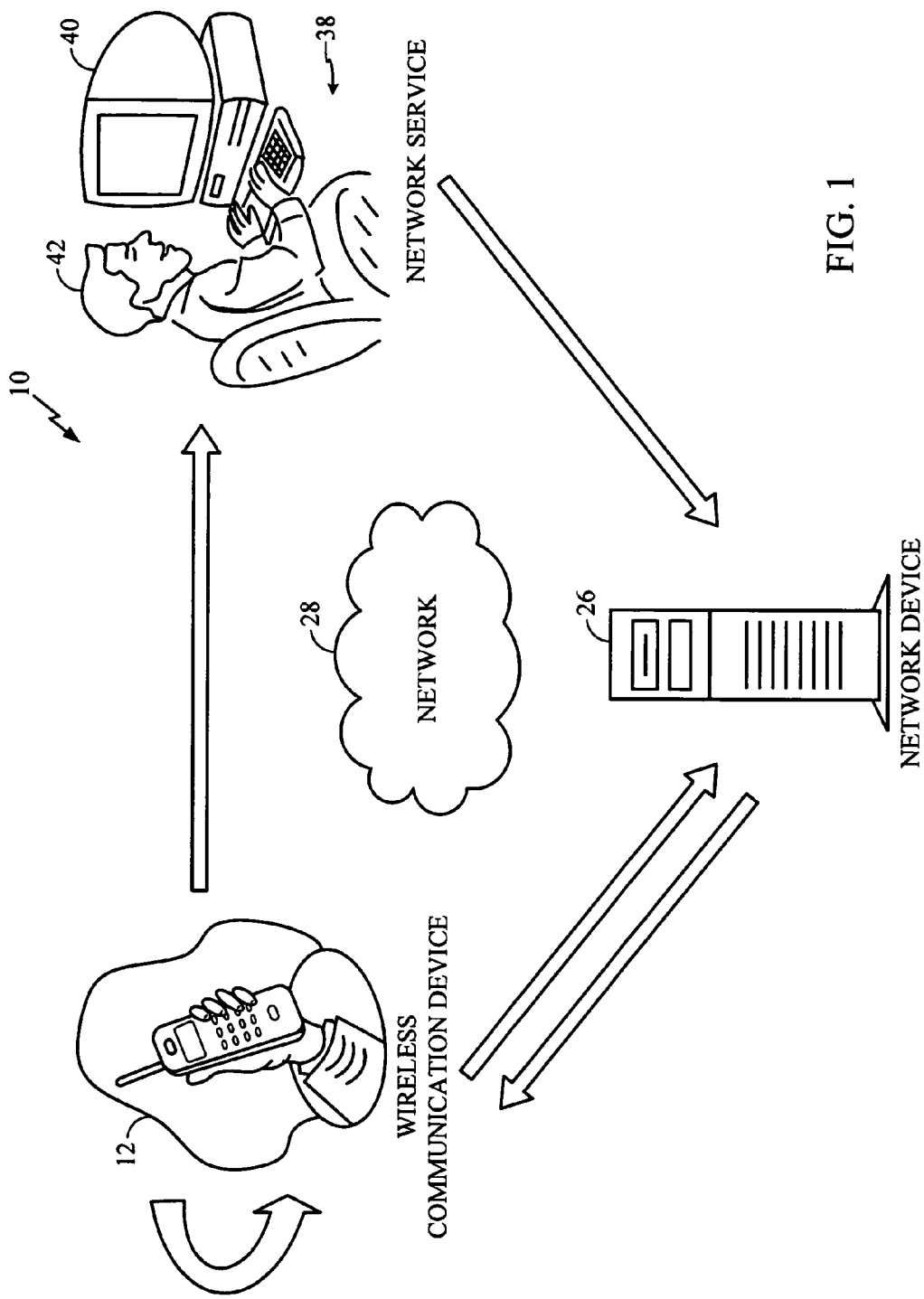
FIG. 1 is a schematic diagram of one aspect of a system for providing user-assistance demonstrations in a wireless device.
Figure 2:
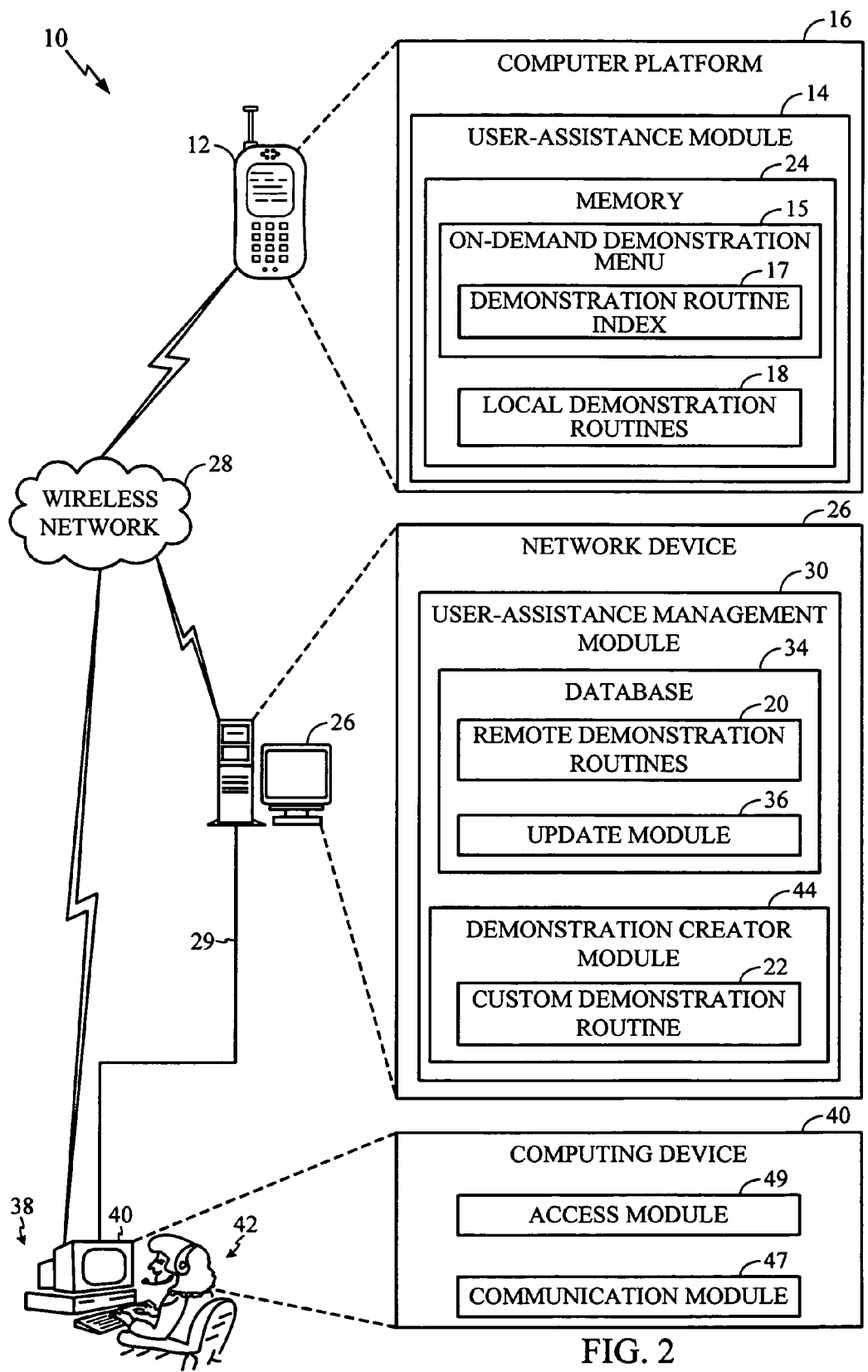
FIG. 2 is a schematic diagram of one aspect of a system for providing user-assistance demonstrations in a wireless device.

Referring to FIGS. 1 and 2, one aspect of an on-demand user-assistance system 10 for providing user-assistance to a wireless communication device includes a wireless communication device 12 (also referred to herein as the "wireless device") having a resident user-assistance module 14 resident within the wireless device's computer platform 16. The user-assistance module 14 provides a user of the wireless device access to local demonstration routines 18, remote demonstration routines 20 and/or custom demonstration routines 22. In one aspect, the locally stored demonstration routines are stored within local memory 24 associated with the computer platform of the wireless device.

In some aspects, the system 10 also includes one or more network devices 26, for example, a user manager server that is in wireless communication with the wireless communication device 12 via wireless network 28. The network device 26 will have a user-assistance management module 30 resident within the network device's computer platform 32. The user-assistance management module 30 is in communication with a database 34 that is associated with the computer platform 32 and stores a plurality of remote demonstration routines 20. The user-assistance management module 30 is associated with the user-assistance module 14 of the wireless device 12 and provides the wireless device with wireless access to the remote demonstration routines 20. Additionally, the user-assistance management module 30 may include a demonstration update module 36 for initiating and/or communicating new demonstration routines or updating pre-existing local demonstration routines 18 stored on the wireless device, as will be discussed in more detail below.

In other aspects, the system may include one or more network services 38, such as the service provider technical support center shown in FIGS. 1 and 2. The technical support center may include a technical support computing device 40 and, in some aspects, a technical support representative 42 for communicating with the wireless device user and the computing device. The technical support computing device 28 is in network communication, in many aspects, wireless network communication, with a network device that is responsible for wirelessly communicating the custom demonstration routine 22 to the wireless device. In some aspects, the network device 26 that stores and communicates the remote demonstration routines 20 may additionally serve as the network device that relays and communicates the custom demonstration routines 22 to the wireless device 12. Further, in some aspects, the technical support computing device 40 may act as a remote terminal that accesses network device 26 in order to execute functionality that enables the generation of custom demonstration routines 22. For example, technical support computing device 40 may include an access module 49 that operates, in conjunction with a communication module 47, to establish communications with network device 26 via wireless network 28 and/or wired network 29. Access module 49 may include one or any combination of hardware, software, firmware, data and executable instructions that allow technical support computing device 40 to interface with a demonstration creator module 44 on network device 26. For example, access module 49 may include Internet browser software for accessing network device 26 and demonstration creator module 44, such as through an enterprise web portal. Demonstration creator module 44 is operable for automatically or manually creating custom demonstration routines 22 as requested by the user of the wireless device. Communication module 47 may include one or any combination of hardware, software, firmware, data and executable instructions that enable external communications between technical support computing device 40 and other devices, as well as internal communications between components of technical support computing device 40. In other aspects, the demonstration creator module 44 may reside on technical support computing device 40, which may create the custom demonstration routine 22 and forward it to network device 26. The network service 38 is capable of receiving communication from the wireless device 12 or the user of the wireless device, which notifies the technical support computing device 40 that a user-customized, demonstration routine is needed to address the user's desired assistance request. User-customized demonstration routines, hereinafter referred to as custom demonstration routines 22, may be requested by the user of wireless device 12 in instances in which the pre-existing demonstration routines (i.e., the local demonstration routines 18 and the remote demonstration routines 20) do not address the assistance being requested by the device user.

In one aspect, the user-assistance module 14 is executed in the following manner. The module is activated by user-input to the wireless device and, upon activation, a menu of pre-existing demonstrations is presented to the user. For example, in some cases, upon launching user-assistance module 14, the module may automatically communicate with network device 26 and obtain a new or updated demonstration routine index 17 for display on in an on-demand demonstration menu 15 presented to the user by the wireless device 12. For example, in some cases, user-assistance module 14 may not have the demonstration routine index 17, and thus the entire index may be obtained. In other cases, user-assistance module 14 may have in memory 24 a version of the demonstration routine index 17, and may compare this version with the most up-to-date version of the index available from network device 26 and only update portions of the index that have changed. The user may select a pre-existing demonstration from the demonstration routine index 17 based on the function or problem being encountered by the device user. In alternate aspects, the user-assistance module 14 may be configured to automatically execute a pre-existing demonstration routine based on pre-determined inputs to the wireless device. For example, repeated erroneous inputs to the device may automatically prompt the user-assistance module to execute one of the pre-existing demonstrations corresponding to the active application and/or inputs.

In another aspect, if the selected pre-existing demonstration is stored on the local memory 24 associated with the wireless device 12, the user-assistance module 14 may access the memory, retrieve the selected local demonstration routine 18 and execute the demonstration routine.

In another aspect, if the selected pre-existing demonstration routine is not stored locally, then the wireless communication device may initiate wireless communication with the network device 26 that stores or has access to the remote demonstration routines 20, download the selected demonstration routine from the network device and execute the demonstration routine on the wireless device. In some aspects, the selected demonstration routine may be downloaded completely prior to execution on the wireless device. In other aspects, to reduce the wait time of the user, some predetermined portion of the selected demonstration routine may be downloaded, and the wireless device may begin to execute this predetermined portion while the remaining portion is streamed to the wireless device. Further, in one aspect, the remote demonstration routines 20 are accessed and downloaded to the wireless device seamlessly, without the user acknowledging that the remotely stored demonstration routine is being accessed and wirelessly communicated from a remote network device 26. Seamless access and downloading of the remote demonstration routines provides additional efficiency to the overall process of providing on-demand user-assistance to the device user. In an alternate embodiment, the user of the wireless device 12 may be presented with an option to establish a wireless communication connection with the network device for the purpose of downloading the remote demonstration routine 20.

In yet another aspect, if the assistance that is being sought by the device user is not among the pre-existing demonstration routines (i.e., the local demonstration routines 18 and the remote demonstration routines 20) then the user or the device may communicate with a network service 38, such as a service provider technical support center or the like. The network service may then automatically or manually generate a custom demonstration routine 22 based on the assistance being requested by the user or device. For example, in some aspects, the user of the wireless device communicates the desired assistance to a technical representative who executes demonstration creator module 44 to generate a custom demonstration routine 22 that provides the user with the desired assistance. For example, in some cases, such as where the technical representative does not write software code, custom demonstration routine 22 may provide simple building blocks relating to a user input or step in a method associated with a demonstration routine which can be used by the technical representative to create the presentation of information in a custom demonstration routine. Further, demonstration creator module 44 may then convert the simplified building blocks provided by the technical assistant into executable code, such as a script, that may be used by the wireless device to generate the custom demonstration routine. In other cases, the technical representative may write the executable code that defines the custom demonstration routine 22. Once created, the custom demonstration routine 22 may be wirelessly communicated to the wireless device 12 via a network device and executed on the wireless device.

In some aspects, the pre-existing demonstration routines may be stored both locally at the wireless communication device 12 and remotely at one or more network devices 26. In some cases, memory limitations on the wireless communication device may dictate that only frequently used or commonly-used demonstration routines be stored on the local memory 24 associated with the wireless device 12 and all other demonstration routines are stored remotely at the one or more network devices 26. However, in alternate aspects, it may be possible to store all of the demonstration routines on the local memory 24 associated with the wireless device or all of the demonstration routines may be stored remotely at the one or more network devices 26.

The demonstration routines 18, 20 and 22 may be user-interactive demonstration routines that require the device user to interact with the demonstration by providing inputs to one or more user input mechanisms (45 of FIG. 3), such as a keypad, input button or switch, touch-screen display, microphone, or any other user-interface associated with the wireless device. The demonstration routines may be visual demonstrations displayed on an output mechanism (46 of FIG. 3), such as a display associated with the wireless communication device. Additionally, the demonstration routines may be audio demonstrations presented to the user via a speaker associated with the wireless device or the demonstration routines may be combined audio and visual demonstrations utilizing requisite output mechanisms. Thus, demonstration routines 18, 20 and 22 may include executable code, data such as a text file, and attachments such as audio, video and/or graphics files that when executed provide a presentation of step-by-step instructions, which in some cases may be interactive, to a user of a wireless device to assist the user in using the device.

Figure 3:
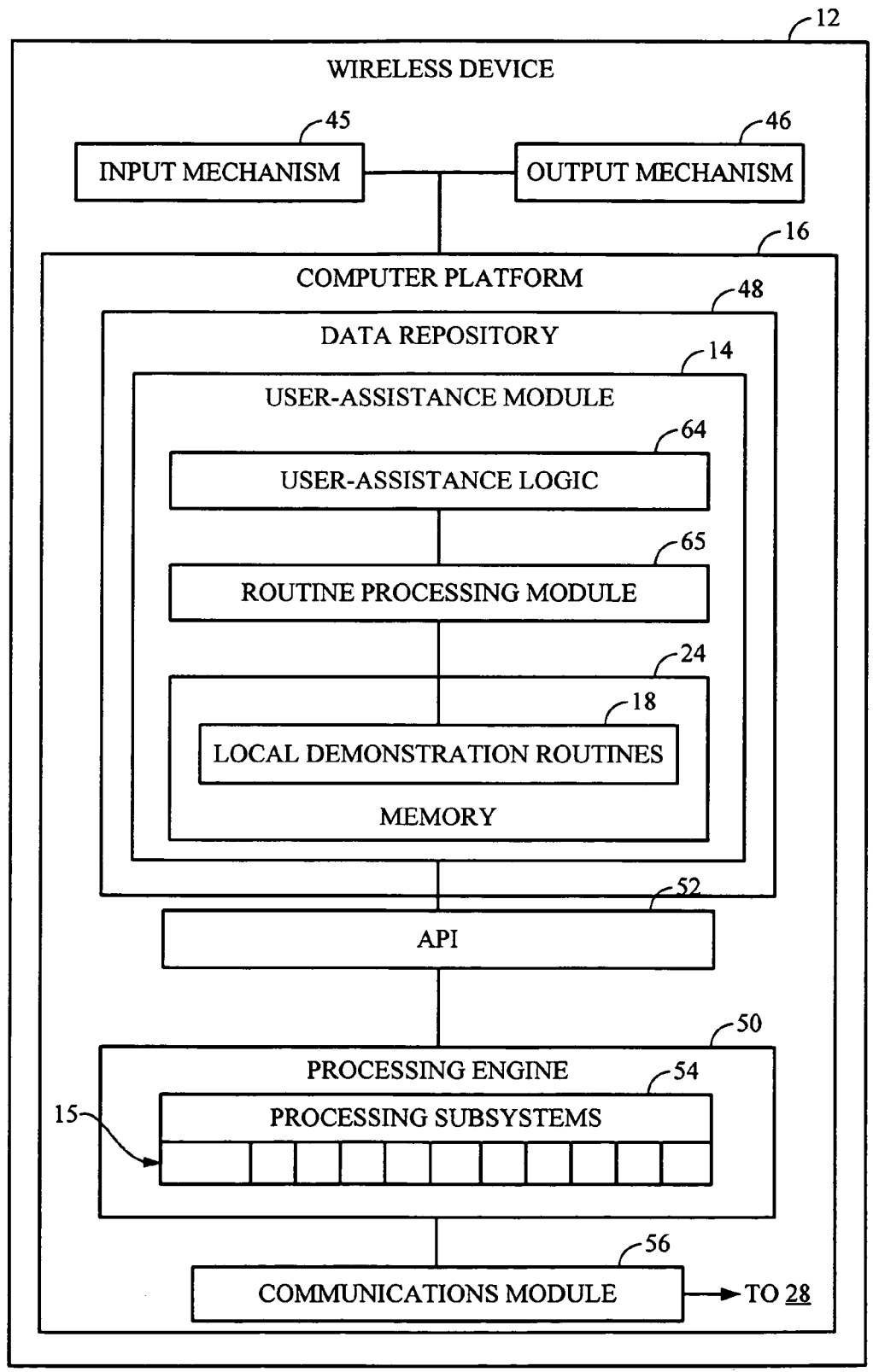
FIG. 3 is a schematic diagram of one aspect of the wireless device of FIGS. 1 and 2.

Referring to FIG. 3, the wireless device 12 can include any type of computerized, wireless device, such as cellular telephone, Personal Digital Assistant (PDA), two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 28, such as remote sensors, diagnostic tools, data relays, and the like. The apparatus and method for on-demand user-assistance can accordingly be performed on any form of wireless device or computer module, including a wired or wireless communication portal, including without limitation, wireless modems, PCMCIA cards, access terminals, personal computers, telephones, or any combination or sub-combination thereof.

Additionally, wireless device 12 has input mechanism 45 for generating inputs into wireless device, and output mechanism 46 for generating information for consumption by the user of the wireless device. For example, input mechanism 45 may include a mechanism such as a key or keyboard, a mouse, a touch-screen display, a microphone in association with a voice recognition module, etc. In certain aspects, the input mechanisms 45 may provide for user input to activate the user-assistance module, choose an appropriate demonstration routine and execute user inter-active functions during execution of a demonstration. Further, for example, output mechanism 46 may include a display, an audio speaker, a haptic feedback mechanism, etc. In certain aspects, the output mechanisms assist in providing a user access to demonstration routines and execution of the demonstrations.

Further, wireless device 12 has computer platform 16 that can transmit data across wireless network 28, and that can receive and execute routines and applications and display data transmitted from network devices 26, such as user manager server or another computer device connected to wireless network 28. Computer platform 16 includes a data repository 48, which may comprise volatile and nonvolatile memory such as read-only and/or random-access memory (RAM and ROM), EPROM, EEPROM, flash cards, or any memory common to computer platforms. Further, data repository 48 may include one or more flash memory cells, or may be any secondary or tertiary storage device, such as magnetic media, optical media, tape, or soft or hard disk.

Further, computer platform 16 also includes a processing engine 50, which may be an application-specific integrated circuit ("ASIC"), or other chipset, processor, logic circuit, or other data processing device. Processing engine 50 or other processor such as ASIC may execute an application programming interface ("API") layer 52 that interfaces with any resident programs, such as user-assistance module 14, in a data repository 48 of the wireless device 12. API 52 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 50 includes various processing subsystems 54 embodied in hardware, firmware, software, and combinations thereof, that enable the functionality of wireless device 12 and the operability of the wireless device on wireless network 28. For example, processing subsystems 54 allow for initiating and maintaining communications, and exchanging data, with other networked devices. In one aspect, such as in a cellular telephone, communications processing engine 50 may include one or a combination of processing subsystems 54, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed aspects, processing subsystems 54 of processing engine 50 may include any subsystem components that interact with applications executing on computer platform 16. For example, processing subsystems 54 may include any subsystem components which receive data reads and data writes from API 52 on behalf of the user-assistance module 14. Further, locally stored demonstration routines 18 that is gathered and then logged in the local memory unit 24 is available from these subsystems 54.

Computer platform 16 may further include a communications module 56 embodied in hardware, firmware, software, and combinations thereof, that enables communications among the various components of the wireless device 12, as well as between the wireless device 12 and the wireless network 28. The communication module may typically include a parser (not shown in FIG. 3) for parsing requests from remote network devices for initiation of wireless network communication. Additionally, the communication module may include the requisite hardware, firmware, software and/or combinations thereof for establishing a wireless communication connection.

Computer platform 16 further includes user-assistance module 14 that provides on-demand user-assistance in the form of demonstration routines. User-assistance module 14 may include any hardware, software, firmware and/or other set of executable instructions operable to provide demonstration routines on the wireless device 12, and transmission across the wireless network 28, of any information relating to the demonstration routines, such as the need to request a remote demonstration routine 20, the need to request updates to the local demonstration routines 18 or the like. In one aspect, user-assistance module 14 includes user-assistance logic 64 that provides the capability to store and provide access to, or forward, demonstration routines. Further, in some aspects, user-assistance module 14 includes routine processing module 65 that executes the selected demonstration routine and presents the routine to the user. For example, in some aspects, routine processing module 65 may invoke other applications stored on the wireless device, such as audio- and/or video-related applications, as well as utilizing processing engine 50 and/or processing subsystems 54 in order to generate the demonstration routine. The user-assistance module may also include a local memory unit 24 that stores one or more local demonstration routines 18. User-assistance module 14 may be initiated at any time, either automatically based on pre-determined user inputs, as explained in more detail herein, or at the request of the user by input to a predetermined input mechanism 45 and, as such, the demonstration routines may be retrieved from memory and executed at any time either automatically based on user inputs or at the request of the device user.

Figure 4:
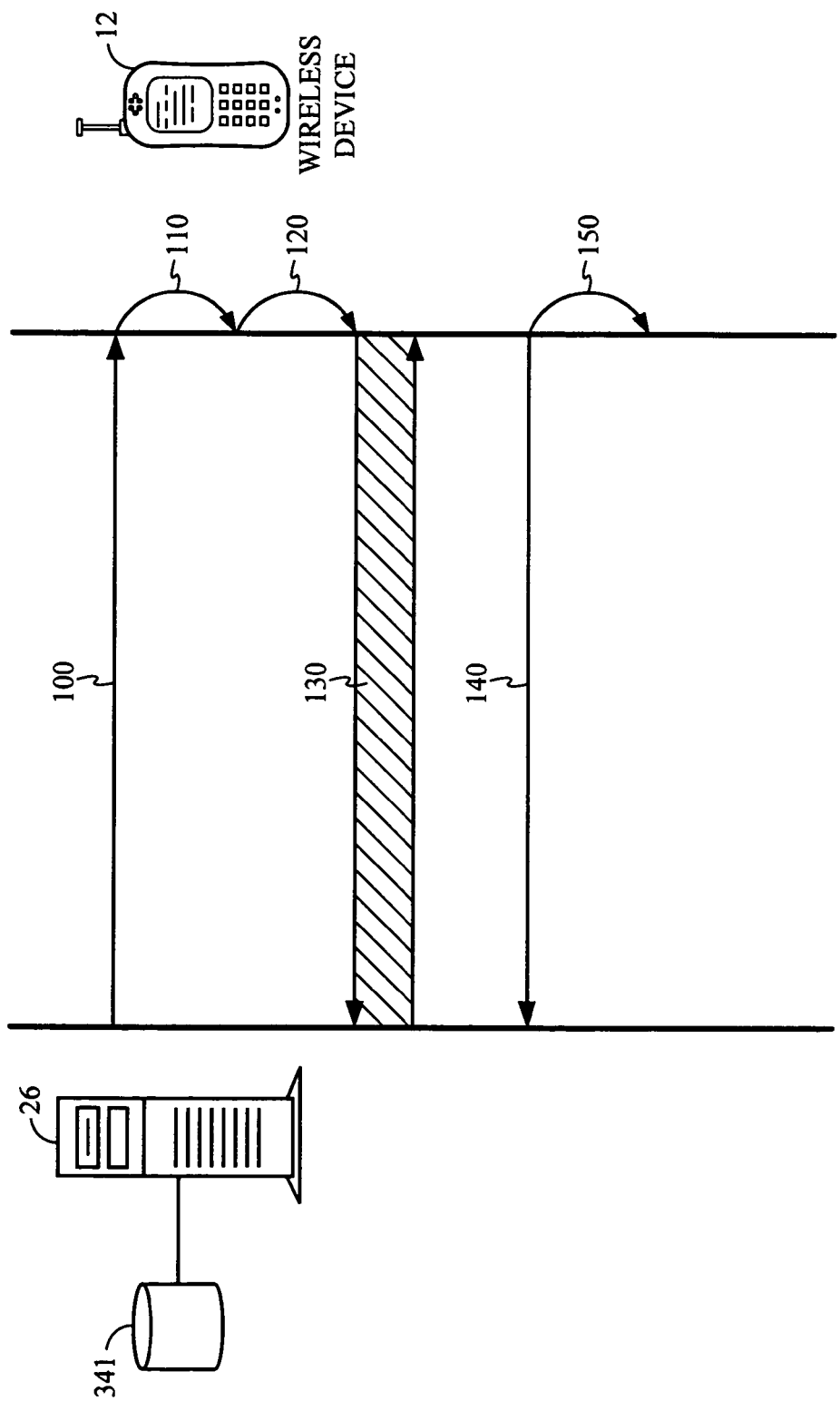
FIG. 4 is a message flow diagram associated with one aspect of a network device initiated operation for demonstration routine communication.

Referring to FIG. 4, in one aspect, a method for communicating a demonstration routine index and/or a demonstration routine wirelessly is illustrated. Communicating a demonstration routine index and/or demonstration routines wirelessly includes, but is not limited to: communicating one or more of a demonstration routine index, a demonstration routine listing in the index, and/or a demonstration routine to a pre-existing wireless device to initially establish a local version of the demonstration routine index and/or a local library of one or more local demonstration routines based upon an on-demand user request or to establish a library of commonly-used assistance routines; communicating a new demonstration routine index, a new listing in the index, and/or a new demonstration routine to a wireless device as they become available or based upon a predetermined event; and sending revised or updated demonstration routine index, listing in the index, and/or demonstration routine to the wireless device as they become available or based upon a predetermined event. In this case, the predetermined event may include, for example, powering-up of the wireless device, the establishment of a data connection by the wireless device, launching of the user-assistance module, etc.

The FIG. 4 illustration depicts an example of one possible flow for communicating the index of demonstration routines and/or the demonstrations, in which, the network device (26) initiates the communication. Network device initiated communications may be dictated by a new index and/or demonstration routine becoming available or revisions/updates to pre-existing indexes and/or routines becoming available. The process may be initiated as new or updated indexes/routines become available, upon occurrence of a predetermined event, and/or on a predetermined time interval. At Event 100, the network device (26) sends an initial bootstrap command to the user-application module (14) of the wireless device (12). The bootstrap command may be sent via Short Message Service (SMS) communication, Automatic Call Back (ACB) communication or any other applicable communication medium. Once the wireless device is in receipt of the bootstrap command, at Event 110, the user-assistance module parses the bootstrap command and, at Event 120, establishes a wireless communication connection with the network device (26). The communication connection may be established using Hyper Text Transfer Protocol (HTTP) or any other applicable communication protocol, suitable for file transfer, may be implemented. At Event 130, a demonstration routine index and/or one or more remote demonstration routines are downloaded from the remote network device via the established communication connection. Once the demonstration routine index and/or demonstration routines have been downloaded, at Event 140, the wireless device sends a download acknowledgement message to the network device that acknowledges successful completion of the download process. At Event 150, the user-assistance module (14) stores the demonstration routine index and/or demonstration routines in local memory (24). At this point, a user of the wireless device may browse the demonstration routine index and/or execute a locally-stored demonstration routine. If the user selects a demonstration routine that is not locally stored, then it may be retrieved from network device, as is discussed below.

Figure 5:
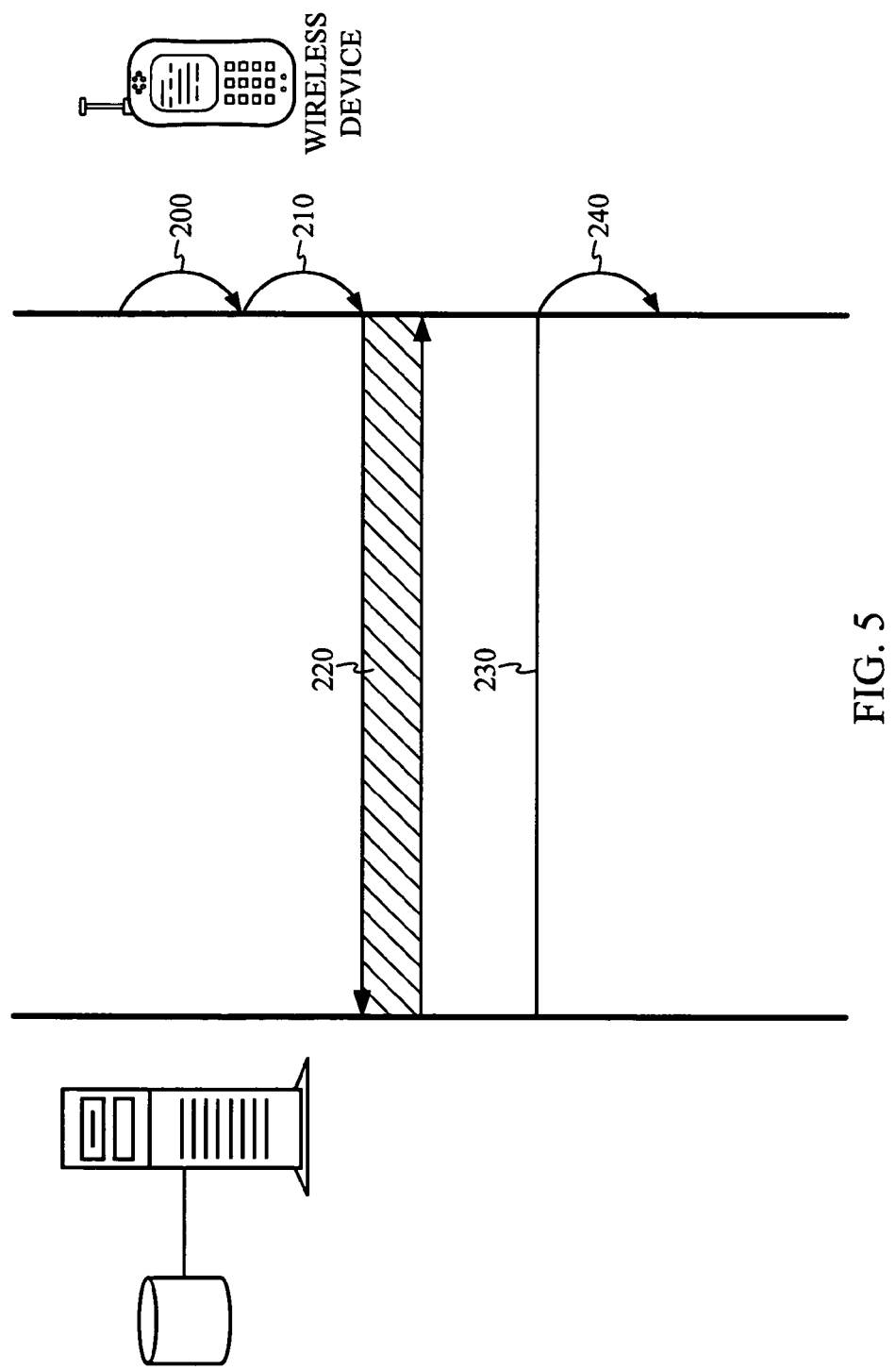
FIG. 5 is a message flow diagram associated with one aspect of a wireless device initiated operation for demonstration routine communication.

The FIG. 5 illustration depicts an example of one possible flow for communicating demonstrations, in which, the wireless device (12) initiates the communication, such as in the case of retrieving remotely-stored demonstration routines. Wireless device initiated communications may be dictated by the need to acquire a local demonstration routine index and/or a local demonstration routine library at the inception of the user-assistance module or the need to obtain new or updated indexes and/or demonstrations on a predetermined interval. At Event 200 the wireless device (12) performs a key sequence command to initiate the updating of the local demonstration routine file stored in local memory (24). Once the wireless device has initiated the updating of the demonstration routine index and/or demonstration routine, at Event 210, the user-assistance module establishes a wireless communication connection with the network device (26). The communication connection may be established using Hyper Text Transfer Protocol (HTTP) or any other applicable communication protocol, suitable for file transfer, may be implemented. At Event 220, the latest version of the demonstration routine index, updates to the existing demonstration routine index, and/or one or more remote demonstration routines are downloaded from the remote network device via the established communication connection. Once the demonstration routines have been downloaded, at Event 230, the wireless device sends a download acknowledgement message to the network device that acknowledges successful completion of the download process. At Event 240, the user-assistance module (14) stores the demonstration routine index and/or the demonstration routines in local memory (24) for access by the user through launching the user-assistance module 14.

Figure 6:
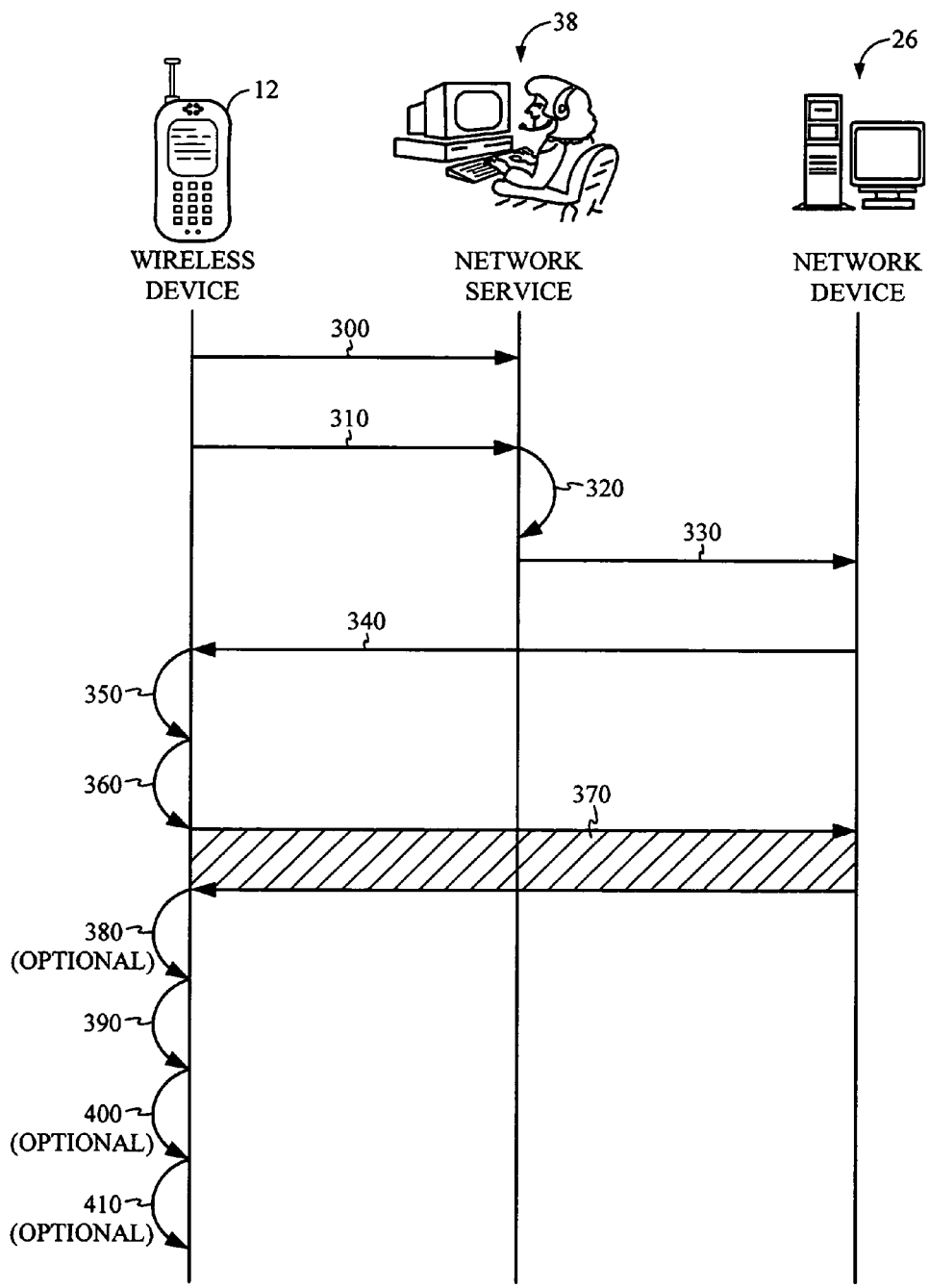
FIG. 6 is a message flow diagram associated with one aspect of generation and communication of a custom demonstration routine.

Referring to FIG. 6, a message flow diagram depicts an example of one possible method for requesting, generating, communicating and executing a custom demonstration routine (22). At Event 300, the user of the wireless device, or in some applications the wireless device, may initiate telecommunications with a network service (38), such as a service provider technical support center to request user-assistance in the form of a custom demonstration routine. In many aspects, the telecommunications may be wireless network (28) communications between the wireless device (12) and the network service (38). However, in alternate aspects, the telecommunications may involve conventional landline, wired, telecommunications between the user and the network service. In many aspects, the initiation of the telecommunications with the network service may be at the direction of the user. For example, the user may be unsuccessful in attempting to locate a pre-existing demonstration routine that addresses the problem that the user is attempting to address. As such, in many aspects, the user-assistance routine (22) may be configured such that the presentation of the demonstration routine index additionally includes an input mechanism for automatically establishing a wireless connection with the network service. For example, the user-assistance module may provide for an option that allows the user to activate the "call" key to automatically place a wireless call to the network service.

At Event 310, the user of the wireless device has established telecommunications with the network service and communicates the problem that they are experiencing or the function for which they desire instructions. In some aspects, communication may be voice and/or data communications between a user of the device and a technical support representative. However, in alternate aspects, the user of the device may communicate with an automated voice or keypad response system as a means of communicating the problem they are experiencing or the function for which they desire instructions. An automated voice or keypad response system may provide additional efficiency for the service provider who desires to limit the number of technical support representatives. In other aspects, through contact with network service 38, the user of wireless device 12 may be directed to launch a browser application and establish a data connection with a given universal resource locator (URL) that is under the control of network device 26 and/or network service 38. In this case, the URL may provide a web page with a questionnaire that the user is directed to complete and submit. Network service 38 may then collect the inputs of the user from the questionnaire and prepare a custom demonstration routine based on those inputs.

At Event 320, in response to the device user communicating the problem they are experiencing, a custom demonstration routine (22) may be generated at the network service level. In most applications, generation of the custom demonstration routine may involve the technical support representative executing the demonstration creator module (44), typically a generic script writing application, to create an appropriate custom demonstration routine. In other applications, the custom demonstration routine may be automatically generated by the demonstration creator module (44) in response to user inputs to the automated voice or keypad response system, or in response to a sequence of building blocks provided by network service 38.

Once the custom demonstration routine (22) has been created, at Event 330, the network service (38) may communicate, wirelessly or wired, the custom demonstration routine

(22) to a network device. In many aspects, the network device may be one of the same network devices (26) that store the remote demonstration routines (20). This may allow for the user-assistance management module (30) resident on the network device (26) to optionally store the custom demonstration routine in the remote demonstration routine library. In this aspect, the custom demonstration routine would effectively become a remote demonstration routine that can be downloaded to the wireless devices (12) as needed. In alternate aspects, the custom demonstration routine may be communicated, wirelessly or wired, directly from the network service (38) to the wireless device (12).

At Event 340, the network device (in many aspects, network device 26) establishes wireless communication with the wireless device (12) by sending an initial bootstrap command to the user-application module (14) of the wireless device (12). The bootstrap command may be sent via Short Message Service (SMS) communication, Automatic Call Back (ACB) communication or any other applicable communication medium. Once the wireless device is in receipt of the bootstrap command, at Event 350, the user-assistance module parses the bootstrap command and, at Event 360, establishes a wireless communication connection with the network device. The communication connection may be established using Hyper Text Transfer Protocol (HTTP) or any other applicable communication protocol, suitable for file transfer, may be implemented.

At Event 370, the custom demonstration routine (22) is downloaded from the remote network device via the established communication connection. Once the demonstration routine has been downloaded, at optional Event 380, the user-assistance module may optionally prompt the user to execute the custom demonstration routine (22) and, at Event 390, the user-assistance application executes the custom demonstration routine on the wireless device. At optional Event 400, once the custom demonstration has been executed, the user-assistance application may prompt the user to store the custom demonstration routine in local memory (24) and, if the user chooses to store the demonstration for future access, at Event 410, the custom demonstration is stored in local memory (24).

Figure 7:
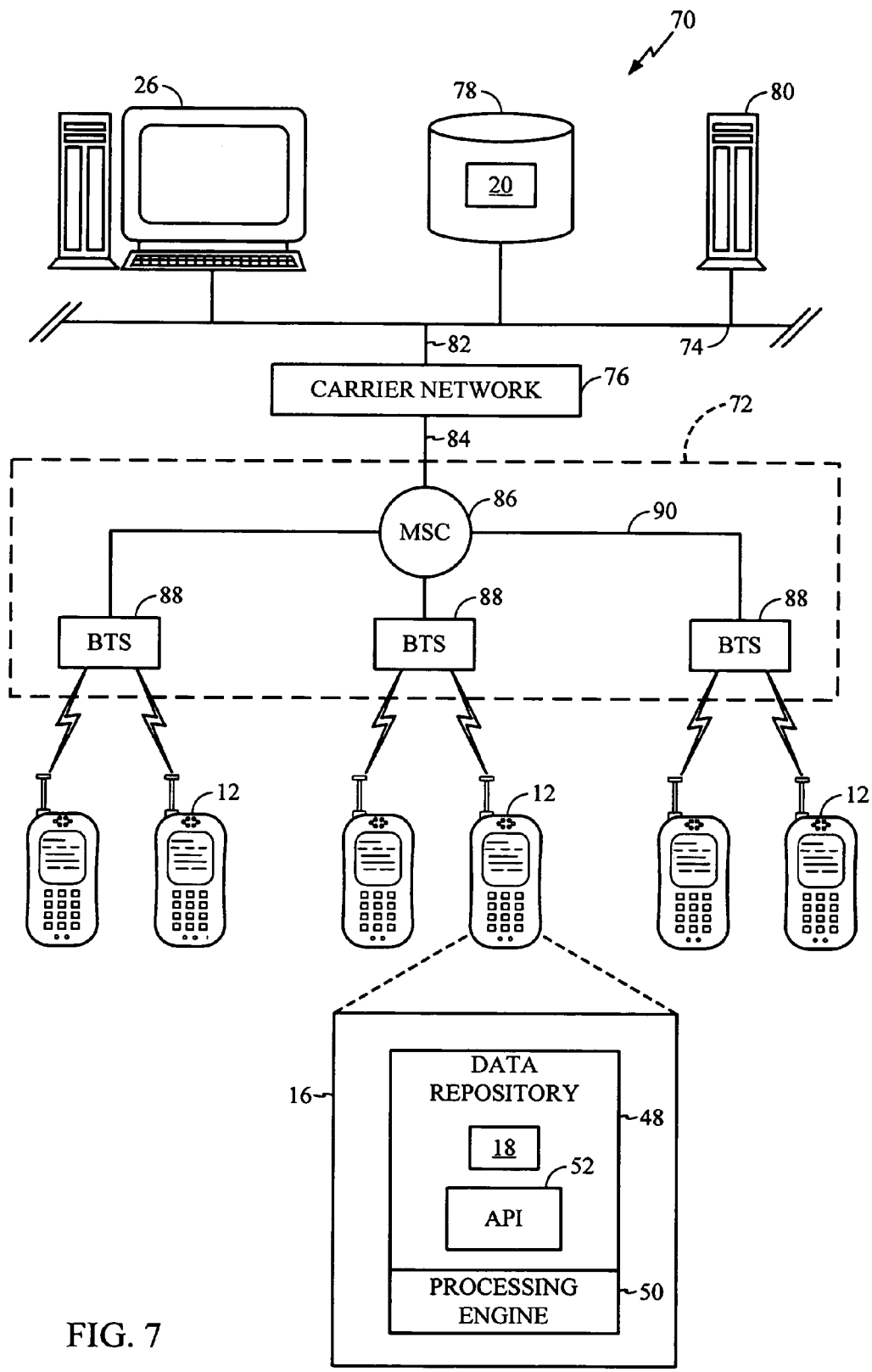
FIG. 7 is a schematic diagram of one aspect of a cellular telephone network associated with FIG. 1.

Referring to FIG. 7, in one aspect, wireless device 12 comprises a cellular telephone. A cellular telephone system 70 may include wireless network 72 connected to a wired network 74 via a carrier network 76. Wireless devices 12 are being manufactured with increased computing capabilities and often can communicate packets including voice and data over wireless network 72. As described earlier, these "smart" wireless devices 12 have APIs 52 resident on their local computer platform 16 that allow software developers to create software applications that operate on the cellular telephone 12, and control certain functionality on the device. FIG. 7 is a representative diagram that more fully illustrates the components of a cellular wireless network and the interrelation of the elements of one aspect of the present system. Cellular wireless network 72 is merely exemplary and can include any system whereby remote modules, such as wireless devices 12 communicate over-the-air between and among each other and/or between and among components of a wireless network 72, including, without limitation, wireless network carriers and/or servers.

In system 70, user manager server 26 can be in communication over a wired network 74 (e.g. a local area network, LAN) with a separate data repository 78 for storing remote demonstration routines or custom demonstration routines. Further, a data management server 80 may be in communication with user manager server 26 to provide post-processing capabilities, data flow control, etc. User manager server 26, data repository 78 and data management server 80 may be present on the cellular telephone system 70 with any other network components that are needed to provide cellular telecommunication services. User manager server 26, and/or data management server 80 communicate with carrier network 76 through a data links 82 and 84, which may be data links such as the Internet, a secure LAN, WAN, or other network. Carrier network 76 controls messages (generally being data packets) sent to a mobile switching center ("MSC") 86. Further, carrier network 76 communicates with MSC 86 by a network 82, such as the Internet, and/or POTS ("plain old telephone service"). Typically, in network 82, a network or Internet portion transfers data, and the POTS portion transfers voice information. MSC 86 may be connected to multiple base stations ("BTS") 88 by another network 90, such as a data network and/or Internet portion for data transfer and a POTS portion for voice information. BTS 88 ultimately broadcasts messages wirelessly to the wireless devices, such as wireless devices 12, by short messaging service ("SMS"), or other over-the-air methods.

Figure 8:
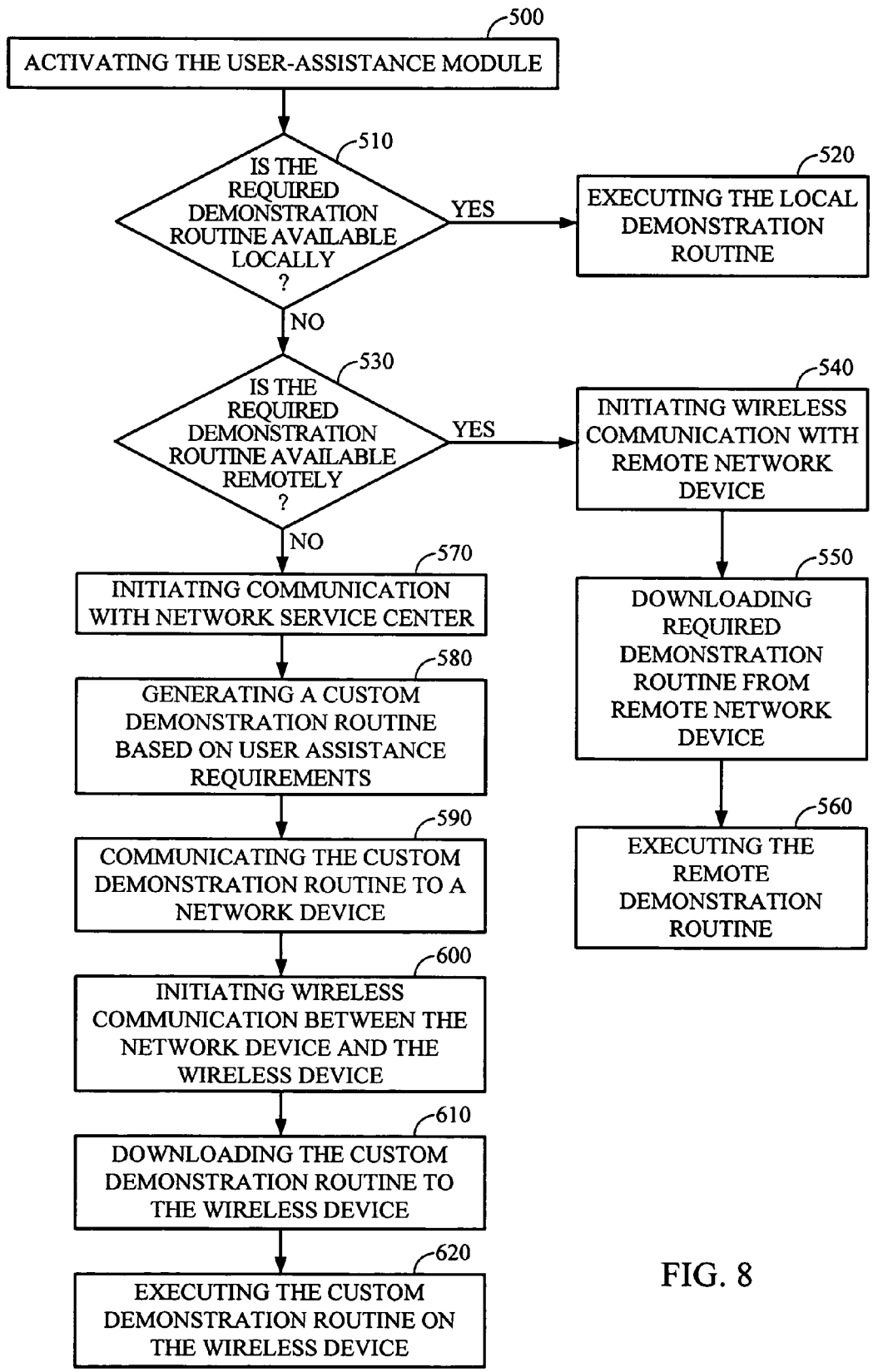
FIG. 8 is a flowchart of one aspect of a method for selecting and executing a demonstration routine on a wireless device.

According to some aspects, FIG. 8 is a flow diagram depicting an example of one possible flow for user-interface with the user-assistance module (14). At Event 500, the user-assistance module is activated. Activation of the user-assistance module may typically involve a user input to an appropriate input mechanism (45). Once activated, the user-assistance module may typically allow for the user to choose a demonstration routine from a list of pre-existing demonstration routines. In many aspects, the list of demonstration routines are visually presented on an output mechanism (46), such as a display associated with the wireless device. In alternate aspects, the user-assistance module may be configured to automatically be activated based on pre-determined user-inputs to input mechanisms. For example, repeated erroneous inputs to the device may automatically prompt the activation of the user-assistance module or cause the user-assistance module to execute a predetermined demonstration.

Once the user-assistance module is activated and the user is presented with one or more demonstration routine options, the user may select from a list of pre-existing demonstration routines. At Decision 510, a determination is made as to whether the assistance being sought has a corresponding local demonstration routine (18). If a local demonstration routine is available, then, upon user selection of the routine, the user-assistance module may retrieve the demonstration from local memory (24) and, at Event 520, execute the local demonstration routine. Once the user-assistance module has executed the demonstration the user may optionally be presented with a prompt for deleting the demonstration from local memory.

If a determination is made that the assistance being sought does not have a corresponding demonstration routine in local memory then, at Decision 530, a determination is made as to whether the assistance being sought has a corresponding remote demonstration routine (20). If a remote demonstration routine is available, typically indicated by representation of the demonstration within a listing then, at Event 540, wireless communication is initiated with a remote network device (26). In some aspects, the initiation of the wireless communication may be seamless, without acknowledgement by the user of the wireless device. In alternate aspects, the selection of a remote demonstration routine may prompt the user with a decision on whether to proceed with establishment of a connection and/or the downloading of a remote demonstration routine. At Event 550, once communication is established, the selected remote demonstration routine is downloaded, typically wirelessly, from the network device to the wireless device. Once downloaded, at Event 560, the remotely stored demonstration routine may be executed on the wireless device. Optionally, post-execution of the remotely stored demonstration routine, the user may be presented with the option of storing the demonstration routine locally for the purpose of efficiently accessing the demonstration routine for future presentation.

If the determination is made that the assistance being sought does not have a corresponding demonstration routine stored locally at the wireless device or stored remotely at a network device then, at Event 570, the user of the device may initiate communication with a network service, such as a service provider technical support center. In many aspects, the initiation of the communication between the device user and the network service is presented as a selectable option within the listing of pre-existing demonstration routines. In such aspects, the user may select the option of contacting the network service for a custom demonstration routine and, upon selection; a wireless communication is initiated between the user and the network service. Once the user has established the communication with the network service and the user has communicated the problem that requires assistance, at Event 580, the network service may generate a custom demonstration routine. In many aspects, the custom demonstration routine is created, on-the-fly, by a technical support representative (42) communicating with the device user and an appropriate demonstration creator module (44) resident on a technical support computing device (40).

Once the custom demonstration routine (22) is generated, at Event 590, the routine is typically communicated, wirelessly or wired, to a network device. In many aspects, the network device may be one of the network devices (26) that execute the user-assistance management module (30) and/or store the remote demonstration routines. In such aspects, the network device may typically store the custom demonstration routine within the file of remote demonstration routines for future access by the wireless devices. At Event 600, the network device initiates wireless communication with the wireless device and, at Event 610, the network device downloads the custom demonstration routine to the wireless device. In alternate aspects, the network service may provide the capability to directly download the custom demonstration routine to the wireless device without having to route the custom demonstration routine through the network device.

At Event 620, the user-application module executes the custom demonstration routine on the wireless device. Once executed, the user-application module may optionally provide for a user prompt asking whether the custom demonstration routine should be stored locally for future access and execution. If the user is presented with this option and chooses to store the demonstration then the demonstration is stored. In alternate options, the custom demonstration routine may be automatically stored locally at the wireless device for a predetermined or indefinite period of time.

The demonstration routines of the present aspects may include any demonstration routine that can be executed on the output mechanisms (46) of the wireless device. Typically, the demonstration routine may be displayed on a display associated with the wireless device. Additionally, the demonstration routines may involve audio output mechanisms, lighted keypad sequences and the like. In particularly advantageous aspects, the demonstration routines may be user-interactive demonstration routines. The use of interactive demonstration routines, in which the user is prompted to make user inputs to input mechanisms as the demonstration is executed further, reinforces in the user the solution to the problem, so that future problems are averted. Examples of demonstration routines include, but are not limited to, keypad simulation routines that provide keystroke simulations on a display or via a sequence of lighted keypad presentations, help window displays, audio presentations and the like.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Thus, the described aspects provide for on-demand, user-assistance in a wireless communication device. The described aspects are capable of providing a device user with efficient access to a large volume of demonstration routines. By storing the demonstrations both locally and remotely and by providing seamless access to the remotely stored demonstrations, the device user benefits from a highly efficient means of providing demonstration routines. Additionally, the described aspects provide for an efficient means for requesting, creating, communicating and executing custom demonstration routines that may be required when the pre-existing, stored demonstration routines do not address the problem that the user is attempting to address. As such, custom demonstration routines can be readily requested, created, communicated and executed by the user of the wireless device in real-time, without the user experiencing unwarranted and undesirable delays.

Many modifications and other embodiments of the invention may come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Additionally, all or a portion of any aspect and/or embodiment may be utilized individually and/or with all or a portion of any other aspect and/or embodiment, unless stated otherwise.

What is claimed is:

1. A method for providing user-assistance demonstrations on a wireless communication device, the method comprising:
    receiving a request for user assistance at the wireless communication device;
    automatically creating a customized demonstration routine based on the request;
    accessing the customized demonstration routine based on the request; and
    executing the customized demonstration routine on the wireless communication device.

2. The method of claim 1, wherein receiving a request for user assistance at the wireless device further comprises communicating with a remote service to request user assistance.

3. The method of claim 2, wherein communicating with a remote service to request user assistance further comprises communicating, wirelessly, with technical support.

4. The method of claim 2, wherein accessing a demonstration routine further comprises receiving, wirelessly, a customized demonstration routine from a remote server at the request of the remote service.

5. The method of claim 1, wherein executing the customized demonstration routine on the wireless communication device further comprises presenting an image of a sequence of key presses on a keypad associated with the wireless communication device.

6. The method of claim 1, wherein executing the user-assistance routine on the wireless device further comprises providing for a display of help windows on a display associated with the wireless communication device.

7. The method of claim 1, wherein executing the user-assistance routine on the wireless device further comprises providing a device user with a request to perform one or more interactive functions.

8. A machine-readable medium comprising instructions, which, when executed by a machine, cause the machine to perform operations, including:
    receiving a request for user assistance at the wireless communication device;
    automatically creating a customized demonstration routine based on the request;
    accessing the customized demonstration routine based on the request; and
    executing the customized demonstration routine on the wireless communication device.

9. At least one processor device configured to perform the operations of:
    receiving a request for user assistance at the wireless communication device;
    automatically creating a customized demonstration routine based on the request;
    accessing the customized demonstration routine based on the request; and
    executing the customized demonstration routine on the wireless communication device.

10. A wireless communication device comprising:
    a computer platform including a processing engine and a memory unit; and
        a user-assistance module stored in the memory unit and operable by the processing engine, the user-assistance module operable to receive a request for user assistance, wherein the user-assistance module is operable to execute a demonstration routine on the wireless device based on the request for user assistance, wherein the demonstraton routine is automatically created based on the request for user assistance.

11. The device of claim 10, wherein the memory unit stores the demonstration routine executable by the user-assistance module.

12. The device of claim 10, further comprising a secondary memory unit that stores the demonstration routine executable by the user-assistance module.

13. The device of claim 10, wherein the demonstration routine comprises an on-demand, user-interactive assistance demonstration.

14. The device of claim 10, wherein the display further provides for displaying a demonstration upon execution of the demonstration routine by the user-assistance module.

15. The device of claim 10, further comprising a user input mechanism, wherein execution of the demonstration routine simulates user inputs related to the user input mechanism.

16. A wireless communication device, the device comprising:
    a means for processing data on the wireless device;
    a means for storing data on the wireless device that is in communication with the mean for processing data; and
    a means for providing, via the means for processing data, a user-assistance demonstration on the wireless device based upon a received request for user assistance, wherein the demonstration is automatically created based on the request for user assistance.

17. A method for wirelessly providing user-assistance demonstrations to a wireless communication device, the method comprising:
    receiving, wirelessly, at a network device, a request for a demonstration routine from the wireless communication device;
    automatically creating a customized demonstration routine based on the request;
    accessing in network device memory the customized demonstration routine; and
    communicating the customized demonstration routine, wirelessly, from the network device to the wireless communication device.

18. The method of claim 17, wherein receiving, wirelessly, at a network device, a request for a demonstration routine from the wireless communication device further comprises receiving, wirelessly, at a network device, a request for a demonstration routine from the wireless communication device, wherein the demonstration routine is not stored in local wireless communication device memory.

19. A machine-readable medium comprising instructions, which, when executed by a machine, cause the machine to perform operations, including:
    receiving, wirelessly, at a network device, a request for a demonstration routine from the wireless communication device;
    automatically creating a customized demonstration routine based on the request;
    accessing in network device memory the customized demonstration routine; and
    communicating the customized demonstration routine, wirelessly, from the network device to the wireless communication device.

20. At least one processor device configured to perform the operations of:
    receiving, wirelessly, at a network device, a request for a demonstration routine from the wireless communication device;
    automatically creating a customized demonstration routine based on the request;
    accessing in network device memory the customized demonstration routine; and communicating the customized demonstration routine, wirelessly, from the network device to the wireless communication device.

21. A method for wirelessly providing user-assistance demonstrations to a wireless communication device, the method comprising:
   generating a customized demonstration routine at a network service node; and
   communicating, wirelessly, the customized demonstration routine to the wireless communication device, wherein the customized demonstration routine was created based on communication between a user of the wireless communication device and the network service.

22. The method of claim 21, further comprising communicating, the customized demonstration routine from the network service node to a network device prior to communicating, wirelessly, the customized demonstration routine to the wireless communication device.

23. The method of claim 21, wherein generating a customized demonstration routine at a network service node further comprises generating a customized demonstration routine at a network service node in response to a similar demonstration routine being unavailable at the wireless communication device.

24. A machine-readable medium comprising instructions, which, when executed by a machine, cause the machine to perform operations, including:
   generating a customized demonstration routine at a network service node; and
   communicating, wirelessly, the customized demonstration routine to the wireless communication device, wherein the customized demonstration routine was created based on communication between a user of the wireless communication device and the network service.

25. At least one processor device configured to perform the operations of:
   generating a customized demonstration routine at a network service node; and
   communicating, wirelessly, the customized demonstration routine to the wireless communication device, wherein the customized demonstration routine was created based on communication between a user of the wireless communication device and the network service.

* * * * *